United States Patent [19]

Alshareedah

[11] Patent Number: 4,677,870

[45] Date of Patent: Jul. 7, 1987

[54] FORGED SPUR GEAR WITH WEB CONNECTED TEETH

[76] Inventor: Ebrahaem Alshareedah, P.O. Box 16155, Qudessiah, Kuwait

[21] Appl. No.: 781,484

[22] Filed: Sep. 30, 1985

[51] Int. Cl.$^4$ ............................................. F16H 55/06
[52] U.S. Cl. ........................................ 74/431; 74/460; 29/159.2
[58] Field of Search ................. 74/421, 431, 432, 433, 74/434, 460, 461, 462; 29/159.2; 72/356

[56] References Cited

U.S. PATENT DOCUMENTS 4,106,360  8/1978  Manna ........................... 29/159.2 X
4,209,086  6/1980  Friedrich ....................... 192/113 R
4,308,760  1/1982  Voigtlander et al. ............ 74/462 X
4,433,568  2/1984  Kondo ................................. 72/356
4,510,788  4/1985  Ferguson et al. ..................... 72/377

FOREIGN PATENT DOCUMENTS 614844  2/1961  Canada ................................. 74/422

Primary Examiner—Cornelius J. Husar
Assistant Examiner—Joseph A. Fischetti
Attorney, Agent, or Firm—Keith Schoff

[57] ABSTRACT

A forged metal spur gear is configured with one lateral face extremity portion extended to the addendum circle of the gear teeth for proving increased load carrying capacity to a gear of a given size.

2 Claims, 1 Drawing Figure

FORGED SPUR GEAR WITH WEB CONNECTED TEETH

FIELD OF ART

Metal spur gears have been made by mold or die casting molten or sintered metal, machining solid metal blanks, and by composite assembly of stampings and forgings, the particular method chosen for a given application being determined by consideration of factors which include dimensional tolerances required, material strength necessary, and economy of manufacture desired.

BACKGROUND OF THE INVENTION

Iron casting was the early choice for manufacturing gears, particularly in larger sizes because cast iron exhibits the advantages of having a hard wear surface provided on a casting surface as it is removed from a mold, and of holding acceptable dimensional tolerance during cooling. However, it suffers the disadvantage relative to steel of being more brittle and less resistant to damage from impact loads. Steel, although more difficult to cast than iron because higher temperatures necessitate use of sand molds and because distortion during cooling is less predictable and usually greater than for iron, became the material of choice for use in gears because of greater resistance to damage from shock loads exhibited than is true for cast iron. However, the complexity of machining, grinding and heat treating steel to provide gears of good quality renders the manufacture of cast steel gears relatively expensive. In addition, the as-cast grain structure of such gears lacks the resilience and strength exhibited by a more refined and densified grain structure produced by forging.

U.S. Pat. No. 2,654,944 discloses stamping or otherwise forming sheet metal into a cup-like disc configuration having an upturned rim, and thereafter heating and placing the article flat in the socket of a stationary die which is configured with a crenelated periphery surrounding the rim of the disc for causing teeth to be expressed from the rim into the crenelations when the disc is worked by a sleeved tool in which the core member fills the cavity defined in the cup-shaped disc and the sleeve member is impressed onto the edge of the rim of the disc. The process is not disclosed for use with steel, and its use with sheet metal, which is defined as having a thickness of less than 0.1875 inch, generally precludes heat treatment such as case hardening of the product made.

A design for strengthening spur gear teeth is disclosed in U.S. Pat. No. 2,862,400 in which a web is provided in a cast gear extending between the gear teeth in a radial plane at midline along the length of the tooth edge, the tooth portions on either side of the web being disposed in staggered arrangement.

SUMMARY OF THE INVENTION

Spur gears are forged from a gear blank for being configured to have an integrally formed web extension of one lateral face extremity portion disposed between gear teeth to the addendum circle as a reinforcement which enables increased tooth loading pressure to be withstood and increased beam strength to be provided to the teeth compared to conventional spur gears of comparable size, such advantages being accrued both because of forged gear construction and because of web connected teeth.

DESCRIPTION OF THE INVENTION

Figure 1:
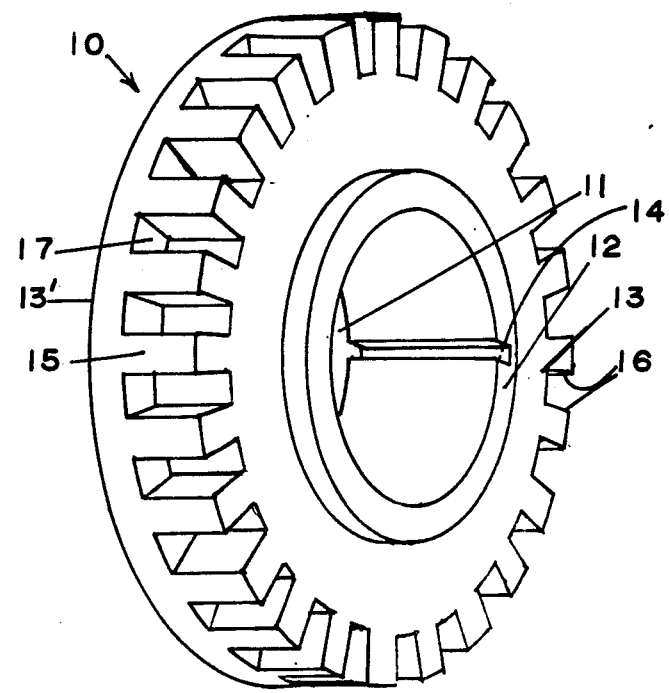
FIG. 1 is a perspective view of an embodiment of a spur gear of this invention.

Referring to FIG. 1, forged spur gear 10 os shown with hub opening 11 defined by collar 12 which extends laterally beyond face 13 of the gear. Keyway 14 is shown for receiving a key in operable manner for securing gear 10 on a mounting shaft, however, any other operable means may be employed. As shown in FIG. 1, face 13 of gear 10 is planar with the end faces 15 of teeth 16, the profile of the teeth being customary for spur gear teeth including rounding of the peripheral extremities although the latter feature is not illustrated in the embodiment of FIG. 1 in pronounced degree. Concealed face 13' of gear 10 as shown in FIG. 1, is configured as an annular plane extending from the outer periphery of collar 12 to the addendum circle of gear teeth 16 and incorporates therein the outboard face of web 17 which is shown disposed as a lateral extremity portion of gear 10 which is integral with and extends between all teeth 16 of gear 10 substantially to the addendum circle of the gear teeth. Web 17 may be provided in any desired thickness, however for maintaining at least the substrate metal of web 17 tough and resilient after heat treating of gear 10, a thickness of not less than about 0.4 inch is desirable.

Gear 10 may be forged by hammer or drop forging with a tool which is caused to repeatedly impact on face 13 of gear 10, the tool being configured with a peripheral extremity fashioned to project from the center portion of the tool face toward the workpiece and consist of crenelatations which define the toothed structure of the gear being formed. The length of such tool projections is less than required to cause the reciprocating tool to impact on the anvil or stationary tool face, the particular length being a function of the thickness of the blank from which gear 10 is to be made and the thickness of web 17 which is desired. The fixing of such dimensions is within the skill of a person skilled in the art, as is the selection of a machine of capacity necessary for operable use of the tool. Gear 10 can also be made by use of a tool which is configured as but a single one of the above mentioned projections and which is reciprocated radially to the gear being formed with the workpiece being indexed in appropriate manner for advancing the peripheral extremity of the workpiece through an arc equal to the angular spacing of the teeth one from the next. Such forging techniques are well known. In the latter method of manufacture collar 12, if provided, would be formed in the gear blank prior to the operation described for forging the teeth. Optionally, collar 12 can be eliminated from gear 10. A further configuration for a tool for forging a spur gear of this invention is that the stationary tool face have an internal gear tooth configuration complementary to that to be formed by working a gear blank and to have the reciprocating tool member have an essentially planar face extending from at least the root circle of the teeth to be formed to the addendum circle of the gear teeth being formed to form the outboard face of web 17 in the formed gear. In all cases gear 10 is of forged, one piece construction.

Gear 10 may be employed in the manner customery for spur gears with full face engagement of teeth 16 with the teeth of a meshing gear or rack, web 17 being disposed laterally offset from such meshing teeth. The edges of teeth 16 which engage with teeth of a meshing gear may be rounded in keeping with good design practice without departing from the teaching of invention.

I claim:

1. A forged steel spur gear having constant pitch diameter radial teeth disposed parallel to the gear axis and configured with a lateral face extremity portion extending as a continuous web integral with gear teeth from the root of said teeth to substantially the addendum circle at one lateral face only of said gear, enabling said gear to be removed from forging dies in conventional manner, the forged metal of said gear being densified and and refined throughout and of geeater strength and resilence than as-cast metal.

2. The spur gear of claim 1 in which said web is. greater than 0.1875 inch thick.

* * * * *